United States Patent [19]

Appel

[11] 4,043,739
[45] Aug. 23, 1977

[54] DISTRIBUTOR FOR THERMOPLASTIC EXTRUSION DIE

[75] Inventor: David W. Appel, Neenah, Wis.

[73] Assignee: Kimberly-Clark Corporation, Neenah, Wis.

[21] Appl. No.: 569,779

[22] Filed: Apr. 21, 1975

[51] Int. Cl.$^2$ ............................................... B29F 3/04
[52] U.S. Cl. ................................. 425/461; 425/376 A
[58] Field of Search ................. 426/72, 461, 464, 465, 426/466, 467, 376, 380; 264/176 R; 72/253, 271; 137/14, 565

[56] References Cited

U.S. PATENT DOCUMENTS

| 2,620,752 | 12/1952 | Braibanti et al. | 425/376 R X |
|---|---|---|---|
| 3,384,925 | 5/1968 | Rothemeyer | 425/461 |
| 3,825,380 | 7/1974 | Harding et al. | 425/725 |

FOREIGN PATENT DOCUMENTS

| 2,013,447 | 7/1971 | Germany | 425/461 |
|---|---|---|---|
| 306,967 | 7/1971 | U.S.S.R. | 425/461 |

Primary Examiner—Francis S. Husar
Assistant Examiner—Mark Rosenbaum
Attorney, Agent, or Firm—Leydig, Voit, Osann, Mayer & Holt, Ltd.

[57] ABSTRACT

An extrusion die for thermoplastic polymer is disclosed having a distributor which provides substantially constant residence time and pressure loss of polymer flowing through the die from the inlet to the extrusion aperture. Dies are disclosed for extrusion of sheet, film and discontinuous microfibers. The distributor has cross flow channels for conveying the polymer laterally and axially connected pressure loss and residence time control sections for independently compensating for the varying pressure loss and residence time characteristics of the polymer flow through the distribution channels. With a distributor so constructed, the overall height of the die remains substantially the same as the die width increases so that the distributor is particularly suitable for dies for wide extrusion lines.

16 Claims, 23 Drawing Figures

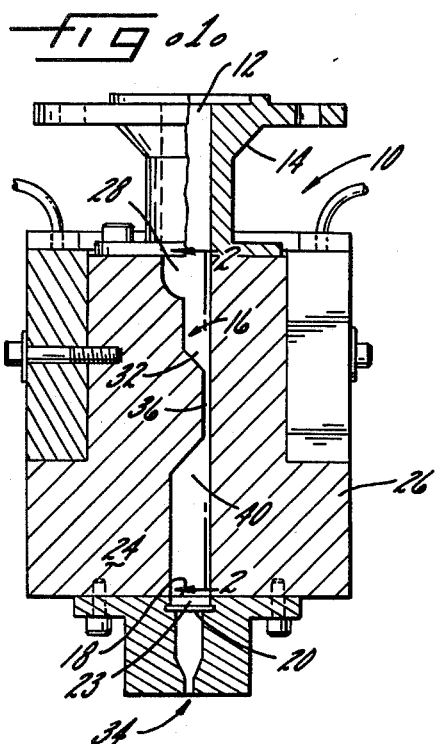
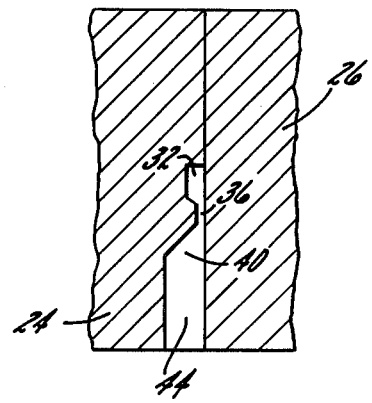
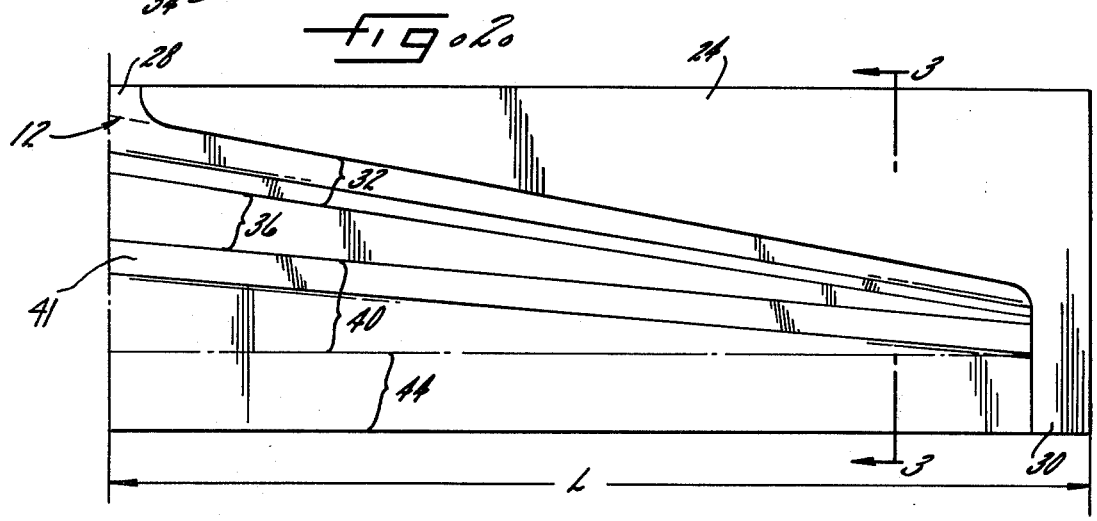
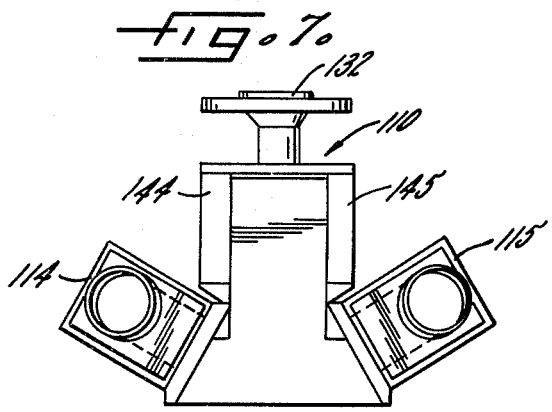
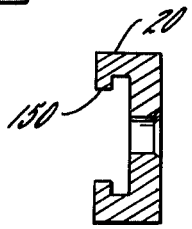

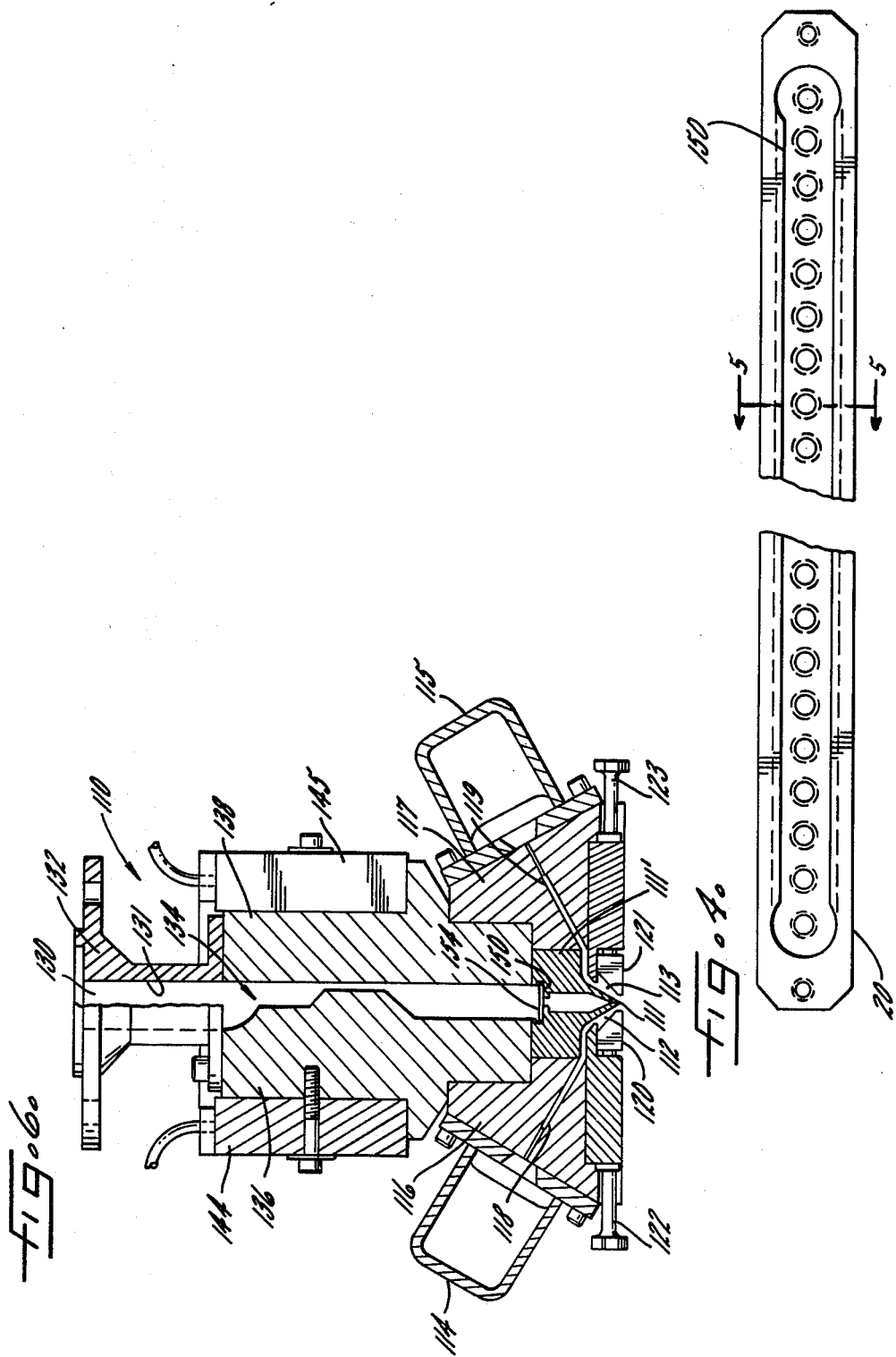

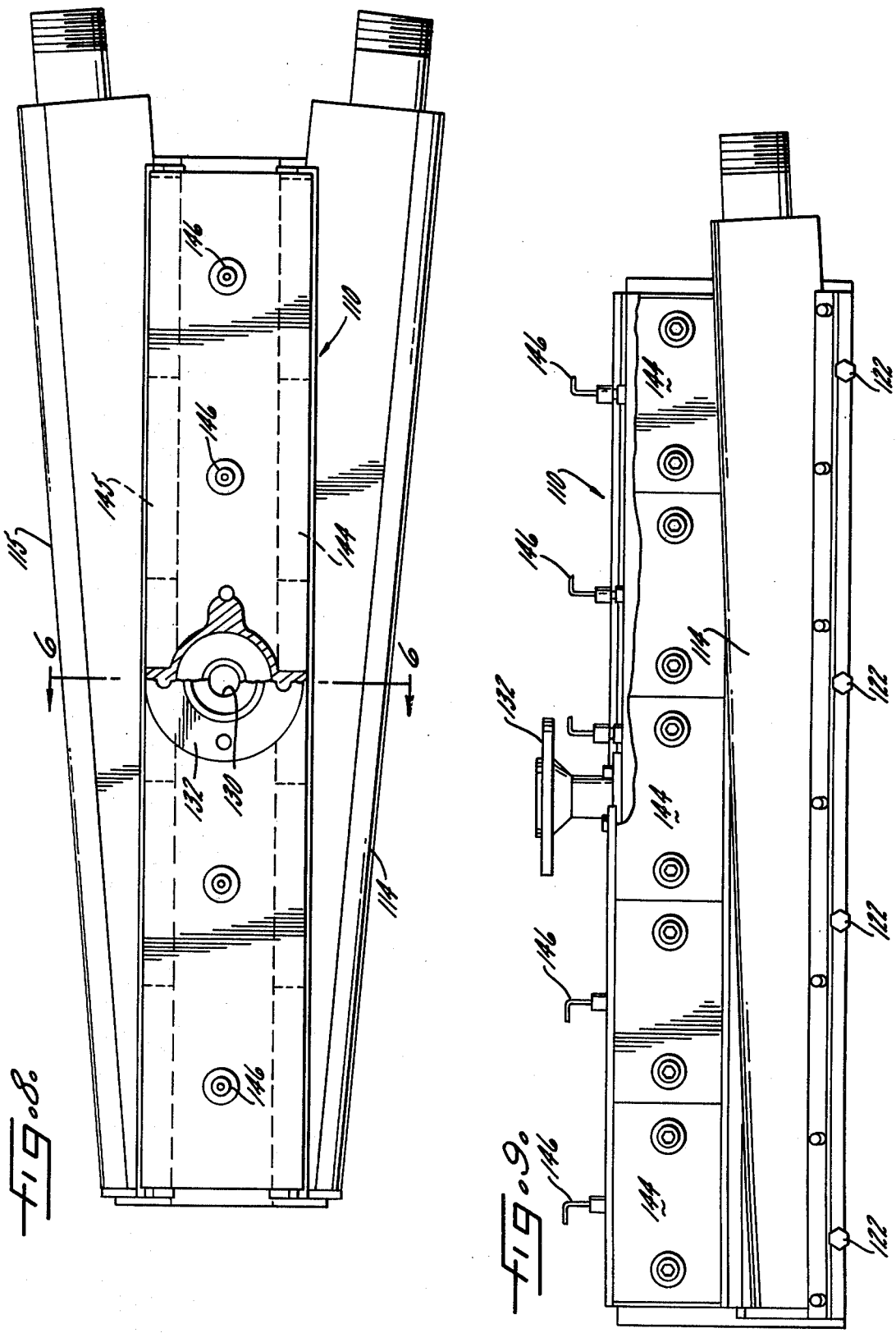

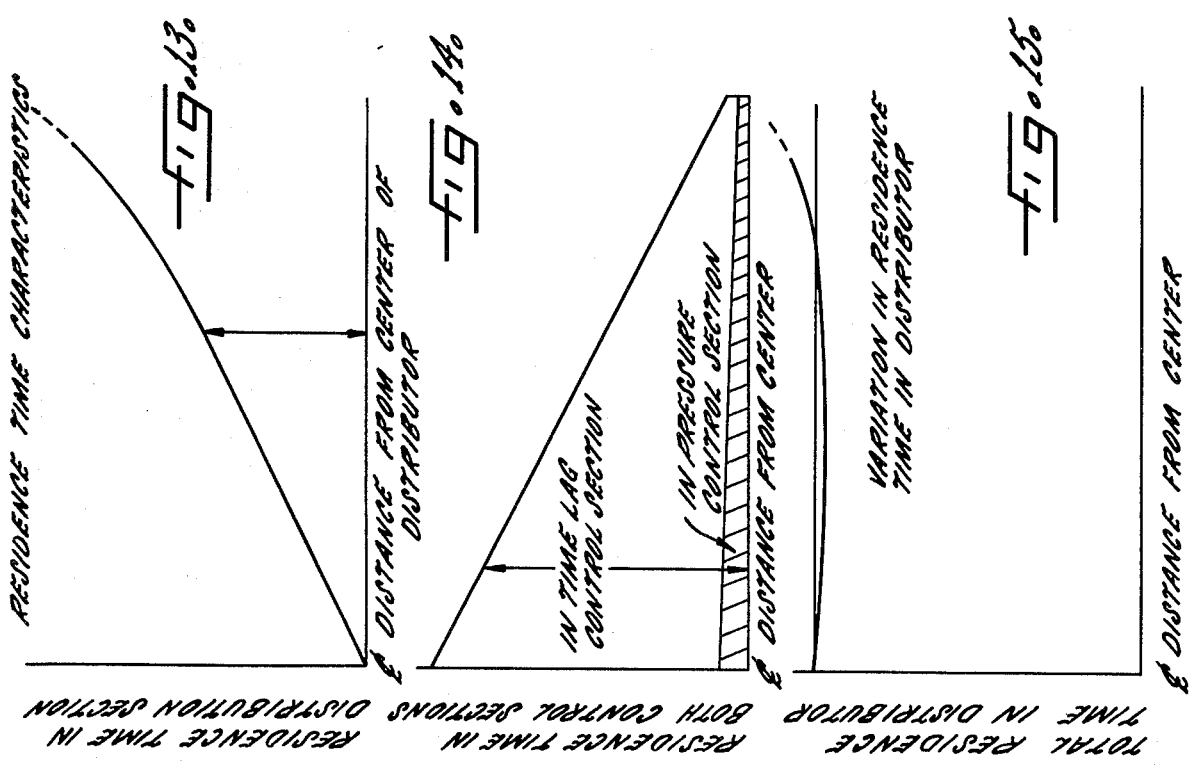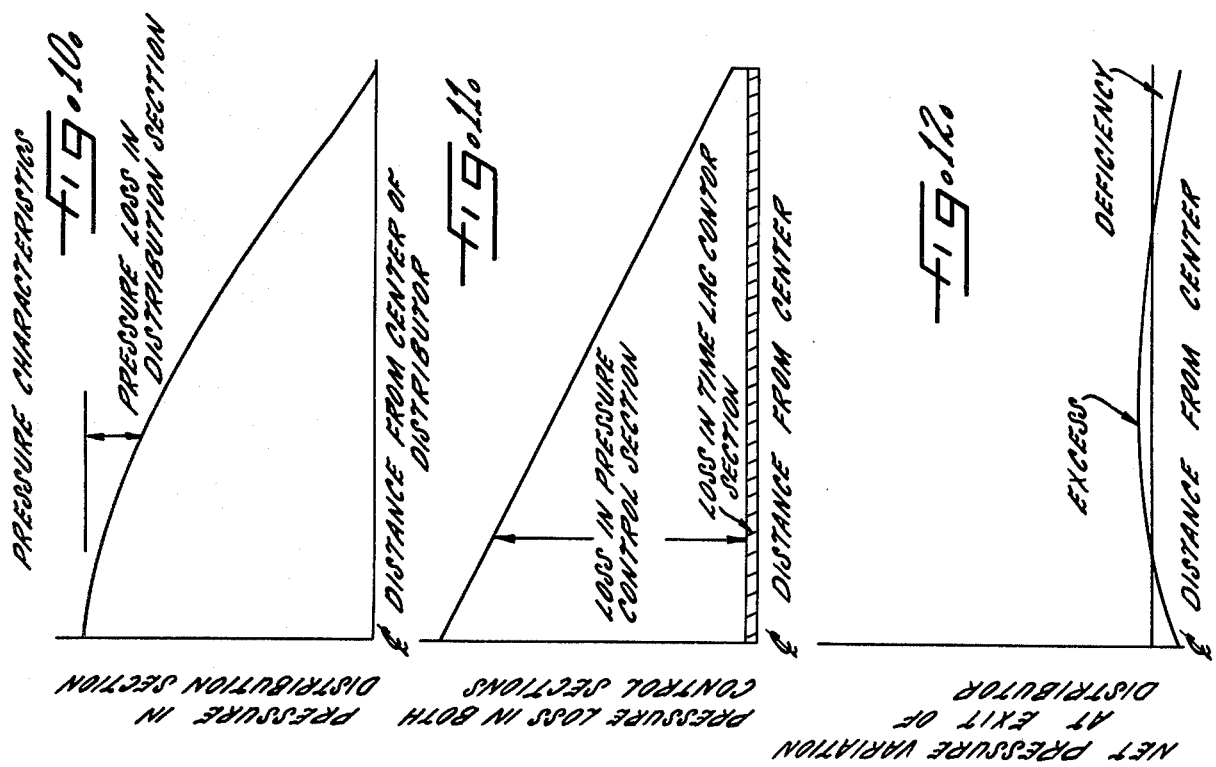

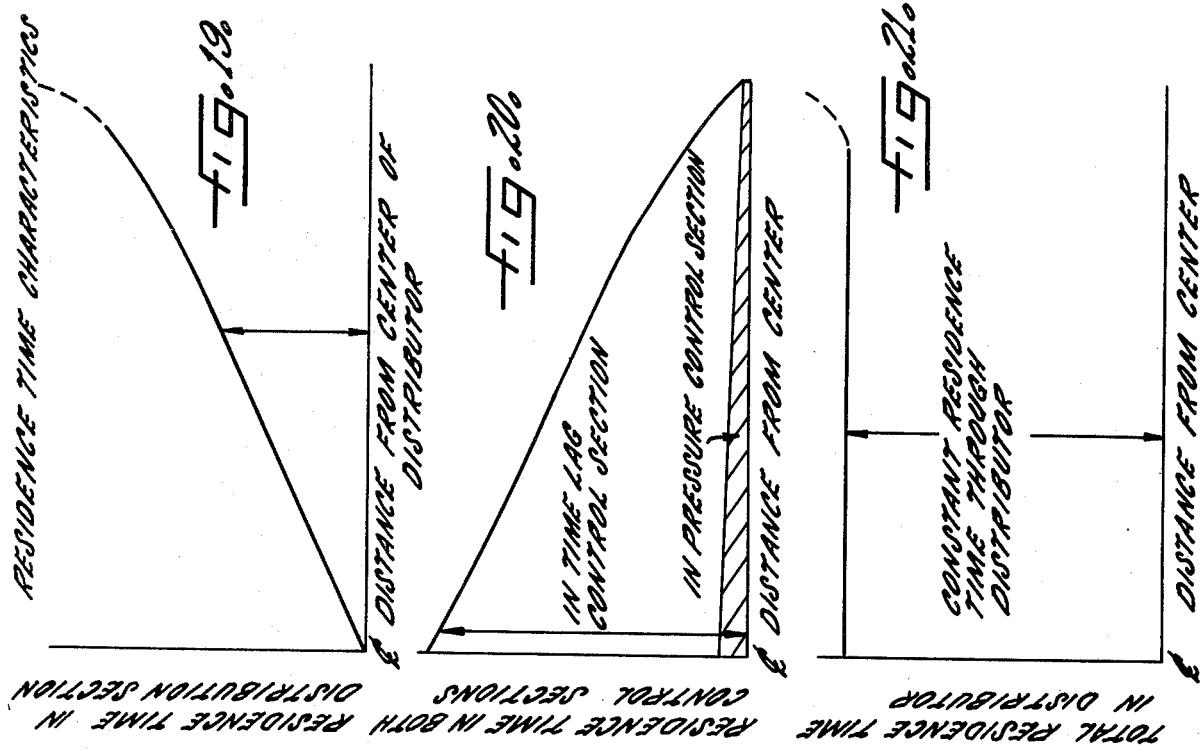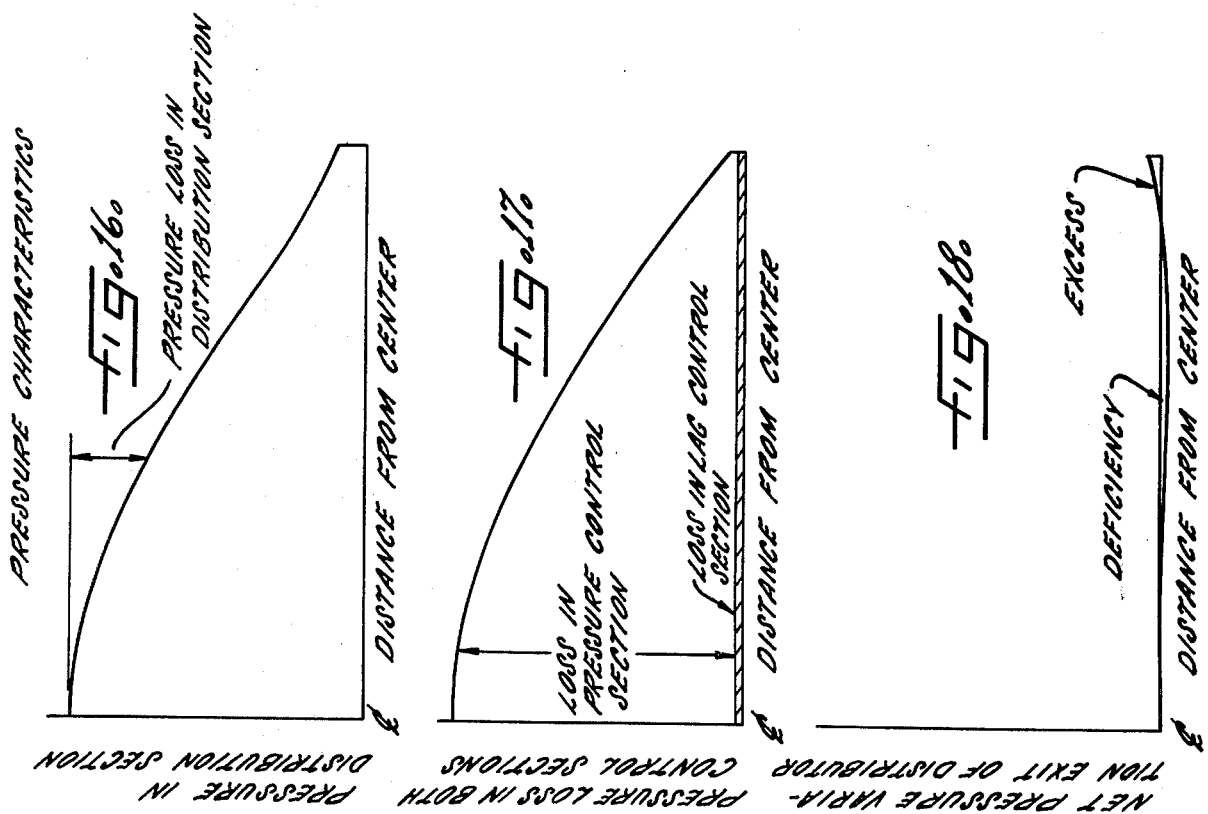

DISTRIBUTOR FOR THERMOPLASTIC EXTRUSION DIE

The present invention relates generally to extrusion apparatus and particularly to extrusion dies for use in making flat film, flat sheet, filaments and fibers from thermoplastic polymeric materials.

Such extrusion dies for the production of flat film and flat sheet take the circular section of the melt which emerges from the barrel of the extruder and redistribute it to the continuous, narrow aperture service as the die orifice. Similarly, in the production of discontinuous fibers, the molten polymer is distributed within the die body to orifice defining means in the form of a row of spaced extrusion apertures through which the polymer is extruded into a pair of converging high velocity air jets at each aperture which attenuate and break the extruded polymer streams to form discontinuous fibers of extremely small diameter commonly referred to as microfibers.

In the extrusion of material with such dies, the polymer is typically raised to elevated temperatures in the extruder and maintained at such temperatures in the die to obtain an extrudable melt. It is well recognized that subsantial uniformity of the exudate at all points across the width of the die is necessary to avoid variations in the material which are visually apparent and to avoid variations in material properties, such as tensile strength, which are not necessarily visually apparent in the extrusion.

Various distributor systems have been incorporated within dies and used heretofore with the objective of obtaining uniformity of the exudate. One known distributor system utilizes a die cavity in the general shape of a coat hanger in which lateral distribution passages or channels convey the molten polymer from the inlet laterally, and a single control zone or section in the form of a longidtudinal thin passage of varying opening and of greater length at the center than at the ends of the die is utilized to compensate for variations in both pressure loss and residence time in polymer flow through the distribution channels, to give constant residence time and pressure loss — on the average — across the entire width of the die. Residence time compensation for the longer flow path to the ends of the distribution channels comes from the control zone which introduces added resistance because of the greater length of the longitudinal passage at the center than at the end. The thin passage results in high velocity of flow and hence a short residence time per unit length. To get sufficient compensation in residence time for a wide die thus requires a relatively long passage at the center of the die and as short as possible a passage at the side or ends. Consequently, with wider and wider dies the height of the coat hanger type die increases to the point where it becomes impractical, both from the standpoint of its sheer mass and from the standpoint of machining it. Modified coat hanger dies have been proposed for wide extrusion lines, but such dies are both structurally massive and internally complex to achieve the requisite control over both pressure loss and residence time.

Keyhole dies which have substantially the same height regardless of width and are particularly suited for wide extrusion lines, have no provision for equalizing residence time. Different portions of the mass of the molten material in the die experience unequal heat exchange with the die body and arrive at the die lips at different temperatures resulting in variations in the exudate. To solve the temperature variation problem proposals have been made such as disclosed in U.S. Pat. No. 3,767,346 to provide sectionalized heating to maintain the molten polymeric material at a uniform temperature and thus uniform viscosity across the width of the die at the die lips or aperture. Even when provided with such temperature compensation devices, the internal distribution configuration of a keyhole die is inherently incapable of providing constant residence time of the polymer across the width of the die. Thus the extrusion of a film or sheet from a degradable polymer may contain significant variations in physical and chemical properties even with temperature compensation of the die. In the case of microfiber production, in particular, with a degradable polymer the properties of the microfibers will vary depending on whether they are formed at orifices at the center or at the ends of the die.

The principal object of this invention is to provide an improved extrusion die for use in making flat film, flat sheet, filaments or microfibers from molten polymeric material by incorporating an improved distribution system for spreading the polymeric material from the melt as received from the barrel of the extruder and distributing it with a constant pressure loss, and with a constant residence time in the die, to all points along the die orifice the entire width of the die.

Another object is to provide a distribution system for extrusion dies which provides constant pressure loss and constant residence time of the molten polymer flowing through the die without requiring a massive die body even for wide dies suited for production of wide films and sheets, or wide webs of microfibers. A related object is to provide constant pressure loss and residence time extrusion dies which are easier to machine and fabricate, and hence less costly to manufacture.

Another object is to provide extrusion dies suited for a wide variety of extrusion applications including both narrow and wide lines, but particularly suited for production of wide film, sheet and webs of microfibers.

More specifically directed to the practical consideration in die manufacture, while heretofore coat hanger die distribution systems provide constant pressure loss and residence time of polymer by utilizing a shaped die cavity having cross flow distribution channels and a single section serving for both pressure loss and residence time control, an important object of this invention is to provide a die which in wider widths is not nearly as massive as the coat hanger die and is easier to machine and build by reason of its utilizing a shaped die cavity serving as a distribution system having separate pressure loss and time lag control sections for independent control of (1) pressure loss and (2) residence time, and assuring uniform out flow across the width of the die.

A related object of this invention is to provide a distribution system for extrusion dies which utilize two control sections or zones rather than one control section or zone as known heretofore, for controlling distribution of the polymer to the orifice defining means of the die.

More specifically, an object of the invention is to provide a die distributor having separate pressure loss and time lag control sections to achieve control of pressure loss and compensation for non-uniformity in residence time with a more compact and more easily machined die structure than known heretofore.

Other objects and advantages will appear from the following description taken in connection with the accompanying drawings in which:

FIG. 1 is a transverse section of an extrusion die embodying the invention, taken in a plane through the mid point of the die and the center line of the inlet from an extruder;

FIG. 2 is a face view looking generally in the direction shown by the lines 2—2 in FIG. 1 of the portion extending from the midpoint to one end of one of the two mating halves making up the body of the die shown in FIG. 1, and diagrammatically illustrates the machined cavity forming the distributor;

FIG. 3 is a fragmentary transverse section of the same extrusion die shown in FIG. 1 taken in a plane at a location near the edge of the die as indicated by the lines 3—3 in FIG. 2;

FIG. 4 is an enlarged plan view of the apertured screen supporting plate mounted in the die of FIGS. 1 and 6;

FIG. 5 is an enlarged transverse section of the plate taken in the plane of lines 5—5 in FIG. 4;

FIG. 6 is a transverse section of a melt blowing system die for microfiber production embodying the invention and taken, as in the case of FIG. 1, in a plane through the midpoint of the die and the center line of the inlet from an extruder;

FIG. 7 is an end elevation of the die shown in FIG. 6;

FIG. 8 is a plan view of the die shown in FIGS. 6 and 7;

FIG. 9 is a side elevation of the die shown in FIGS. 6, 7 and 8;

FIGS. 10-12 are pressure distribution characteristic curves for the control sections of the distributor shown in FIGS. 1, 2 and 3;

FIGS. 13-15 are residence time distribution characteristic curves for the control sections of the distributor shown in FIGS. 1, 2 and 3;

FIGS. 16-18 are pressure distribution characteristic curves for the control sections of the distributor illustrated diagrammatically in FIG. 2a; and FIGS. 19-21 are residence time distribution characteristic curves for the control sections of the distributor shown diagrammatically in FIG. 2a.

Turning now to the drawings, because the invention is applicable generally to molten polymer extrusion processes, the invention is illustrated in two different exemplary systems. In a first more general system application (FIG. 1) the invention is embodied in a die for the extrusion of flat film or flat sheet from molten polymer through die lips defining an orifice. In a second application (FIG. 6), the invention is embodied in a melt blowing system die for producing discontinuous polymeric microfibers by a known technique which involves extruding fine streams of molten polymeric material through a row of closely spaced orifices and attenuating the streams by conveying high velocity heated gas (usually air) to break the polymer streams into discontinuous microfibers of small diameter. In both applications, the invention provides for such dies an internal distributor which is effective to control the pressure loss and residence time of molten polymer flowing through the die so as to substantially equalize the total pressure loss and total residence time between the inlet and all points along the orifice defining means and thus achieve greater uniformity of the exudate.

Figure 3A:
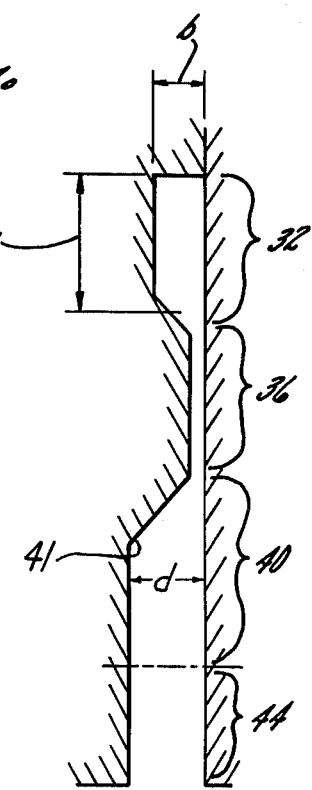
FIG. 3a is a diagrammatic axial section of the distributor cavity shown in FIG. 2 to show legends referred to in equations used hereinafter.

It will be understood that the melt which emerges from the barrel of the extruder is conveyed into the die 10 (FIG. 1) through an inlet 12 in the fitting 14, the axis of the inlet being substantially intermediate the ends of the die. The molten polymer flows through the distributor cavity 16 to the exit 18 which is provided in the usual way with a breaker plate herein shown as an apertured plate 20 extending the entire extent of the exit of the distributor cavity 16. The plate 20 forms a support for receiving and holding a stack of screens 23 which filter solid contaminants out of the molten polymer before it reaches the orifice defining means of the die. In describing hereinafter the dimensions of the sections of the distributor cavity 16, the terms "axial length" and "width" have been used interchangeably to refer to the span between opposite sides of the channels forming the sections measured in the direction of axial flow of polymer, i.e., parallel to the longitudinal axis of the inlet 12. The term "depth" has been used to describe that dimension between opposite sides of the channels perpendicular to the axial length or width dimension, i.e., the dimension $d$ in FIG. 3a.

The distributor cavity 16, in accordance with the invention, is formed between mating steel blocks 24, 26 which when bolted together as shown comprise the distributor portion of the die body. One mating half 26 of the distributor is shown as having a flat inside surface, while the other half 24 is machined such that when the mating elements 24, 26 are placed in abutting relation they together define an internal distributor cavity 16. It is one of the features of the invention that the distributor can be produced from one plain block and one machined block which simplifies machining and reduces cost of the die.

While heretofore distributors for equalizing pressure drop and residence time, for example coat hanger distributors, have employed a distributor section and a single control section for simultaneously controlling pressure loss and residence time, in accordance with the present invention, the distributor is constructed with a distribution section and two separate control sections for independently controlling (1) pressure loss and (2) residence time. By controlling pressure loss and residence time in separate and independent sections, it has been found that the pressure loss control section can be made both quite narrow in opening (depth) and short in axial length measured in the direction of polymer flow, so that the residence time is very short and in practice negligibly small in that section while the section is effective to compensate for variations in pressure loss in the distribution section. Compensating for the non-uniformity in residence time of molten polymer flowing through the distribution section can then be achieved using a residence time control section of relatively short and variable axial length but of large opening (depth) so that pressure loss is constant in that section. All three sections being short, their combined axial length is a minor fraction of the axial length of a coathanger die designed for medium or wide lines, the advantage becoming more and more significant the wider the line. Moreover, since the present invention provides a minimum die axial length, residence time in the die is minimized, as compared with the residence time in coat hanger and modified coat hanger dies of greater axial length and inherently longer residence time, which is important in obtaining uniformity of the exudate particularly with degradable polymers. The design of the time lag and pressure loss control sections are very nearly independent of each other and in practical applications are treated independently. This greatly facilitates the designing of a distributor within whatever variation in uniformity of pressure loss and residence time can be tolerated.

How to construct distributors with such independent control sections will be explained utilizing FIGS. 2 and 2A which, respectively, represent two different exemplary distributor cavity configurations one with straight and one with curved boundaries between control sections, taken with FIGS. 13–18 and FIGS. 16–21 which, respectively, are sets of characteristic curves for the distributor cavity configurations of FIGS. 2 and 2A.

Turning first to FIG. 2, this figure illustrates a distributor cavity configuration having straight boundaries between control sections which makes the cavity relatively simple to machine while being capable of achieving substantial uniformity of pressure loss and residence time of polymer flow.

Molten polymer received from the inlet 12 flows into the entrance 28 to the distributor cavity 16, the cavity being symmetrical laterally of the axis of the inlet 12. FIG. 2 is a face view, somewhat diagrammatic, illustrating the configuration of the cavity 16 as so viewed, between the axis of the inlet 12 and one end 30 of the die half 24, the configurarion of the cavity 16 between the axis of the inlet 12 and the other end of the die being a mirror image of FIG. 1.

In keeping with the invention, the distributor cavity 16 has three axially connected sections including a distribution section 32 for conveying polymer from the inlet 12 laterally the full extent of the orifice defining means 34, a restricted axial passage 36 serving as a pressure loss control section, and an enlarged axial passage 49 serving as a time lag control section which conveys molten polymer through a connecting passage 44 to the breaker plate 20 at the exit from the distributor.

In the form shown in FIGS. 1, 2 and 3 the distribution section 32 is comprised of laterally extending channels having a trapezoidal axial section, which linearly taper in both width and depth such that the ratio of the average or breadth $w$ and depth $b$ remains constant along the channel from the center of the die to the end. A trapezoidal channel is preferred to eliminate a square corner in which polymer can stagnate and degrade. Moreover, linear tapers of both depth and width of a trapezoidal channel for the distribution section are preferred since with linear boundaries such channels are readily machinable and it has been found that within a selected range of tapers such channels are characterized by approximately linear distributions of pressure and residence time as shown in FIGS. 10 and 13, thus minimizing the complications in construction of the pressure and time lag control sections required to compensate for such distributions. With such a configuration for the distribution channels, the section serves its primary function as a header for delivering polymer at a substantially uniform rate across the die.

The equations for the sides of a trapezoidal channel in which the width and depth linearly taper, may be expressed:

$$b = b_0(1 - \frac{X}{CL}), \text{ and}$$

$$w = (1 - \frac{X}{CL}),$$

and the area A at any axial section of a distribution channel with such linearly tapering sides may be expressed:

$$A = A_0(1 - \frac{X}{CL})^2$$

wherein $A_0$ is the cross sectional area at entrance to the distributor channel;

$A$ is area of any axial cross section;

$b_0$ is maximum depth of distributor channel at the entrance;

$b$ is depth of one side of the distributor channel;

$C$ is constant specifying taper of the distribution channel;

$L$ is length of distribution channel (approximately one-half the width of the die);

$w_0$ is average width or span between non-parallel sides of the distribution channel at the maximum cross sectional area at the entrance; and $w$ is average width or span between non-parallel sides of the distribution channel.

Graphically represented, an approximately linear decrease of area A is provided with a constant C in the range of 1.3 – 2.0, departing from linearity primarily near the outer end of the channel. Theoretically, a linear decrease of area A produces linearity of residence time distribution throughout the channel, but the shape of the channel to produce such a linear decrease of the area A is more complex and thus more difficult to machine than a trapezoidal channel with linear boundaries. Within the preferred range of C=1.3–2.0, the residence time characteristic is a distribution channel is more nearly linear for C=1.5 than for C=2.0, but the converse is true for the pressure characteristic. Therefore, in laying out a specific die cavity configuration a choice can be made as to which function should be controlled to optimum uniformity. Where filter screens and an aperture plate are used as in the dies illustrated in FIGS. 1 and 4, they present restrictions to polymer flow which exert a strong leveling effect on pressure at the exit, and it is desirable in such die constructions, therefore, to favor uniformity of residence time using, for example, C=1.5. On the other hand the invention contemplates a more open flow path may be provided at the exit of the distributor and in such a construction it may be desired to favor uniformity of pressure, using for example, C=1.7–2.0. This is a matter of design choice within the teachings of the invention.

Turning now to the presssure loss control section 36 and the time lag control section 40, the passages forming these sections have a depth such that taken with the varying axial lengths of the passages at different lateral distances from the axis of the inlet, these sections independently compensate for the varying pressure loss and residence time of polymer flow through the distribution section channel. Thus, the pressure loss control section has a restricted passage of substantially constant depth and tapering in width, and in which the pressure loss varies as shown by the upper curve of FIG. 11 such that the sum of the ordinates of the upper curve of FIG. 11 and of the characeristic curve of the pressure loss in the distribution section channel 32 as shown in FIG. 10 (measured to the upper base line in FIG. 10) at given lateral distances from the inlet axis, is a substantially constant value.

In the time lag control section 40 because of the enlarged depth of the passage and the pressure loss is small and substantially constant the full extent of the distribution exit, as illustrated by the pressure loss characteristic curve at the foot of FIG. 11. Accordingly, the sum of the ordinates (relative to the designated base lines) of the pressure loss curves of the three sections is a substantial constant value, as illustrated in FIG. 12, varying less than 20% and preferably less than 10% of the maximum pressure drop between the inlet and any point along the exit from the distributor, except at the extreme ends where due to the closing of the ends the variation may exceed that controlled variation. Any large variation at the extreme ends may make it necessary to trim the width of the sheet or trim off fiber web sections at the extreme edges of the sheet produced on a line with the use of the die.

Now turning to FIGS. 13-15, these three Figures illustrate residence time distribution characteristic curves for the three sections 32, 36, 40 of the die. In FIG. 13 the time for flow of polymer through the cross channels of the distribution section 32 to any distance from the center of the distributor is illustrated. It will be seen that for the trapezoidal cross section distribution channels of the die of FIGS. 1, 2 and 3, the residence time distribution characteristic curve will be approximately linear except approaching the ends of the machined cavity where the variation from a straight line will be evident in FIG. 13.

In FIG. 14 the characteristic curve for the time lag through the pressure loss control section 36 is illustrated as a straight line under the cross hatched area at the foot of FIG. 14. Since the depth or size of the passage forming the pressure loss control section 36 is very small, there will be rapid flow through this passage and hence the time lag of axial flow through the section is very small and substantially throughout the die as illustrated in FIG. 14. On the other hand, with the larger cross section passage making up the time lag control section 40, which has substantially constant depth $d$ (FIG. 3a) meaning a fixed depth axially except at the entrance 41 which is beveled to eliminate a pocket in which polymer could connect and stagnate, and which has varying axial length (with greater length at the center than near the ends), a substantial time will be taken for flow of polymer through that passage at the center of the die and progressively less time at increasing distances away from the center toward the die ends as represented by the upper curve in FIG. 14. Thus the time lag control section 40 compensates for the varying time of flow through the distribution section 32 as represented in FIG. 13. It is also in keeping with the invention, that the sum of the ordinates of the residence time characteristic curves of the three sections 32, 36, 40 is substantially a constant value, preferably less than 10% and varying no more than about 20% of the maximum residence time between the inlet and any portion of the exit of the distributor except at the extreme ends. This is illustrated in FIG. 15.

Should it be desired to reduce the tolerance range in pressure and residence time below the 10-20% range referred to above and reflected in the curves shown in FIGS. 12 and 15, that may be achieved by utilizing more complex configurations for the channels or passages of each of the three independent sections of the distributor, such as present in the alternative distributor cavity configuration with curved boundaries between the control sections illustrated by the one-half plan view of FIG. 2A.

Figure 2A:
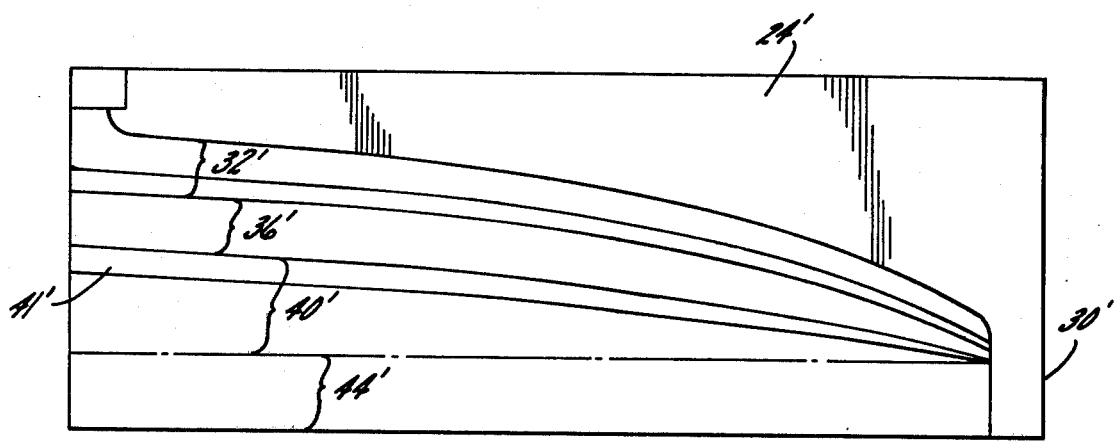
FIG. 2a is a face view similar to FIG. 2 diagrammatically illustrating a machined cavity of alternate configuration to that shown in FIG. 2 with curved boundaries between control sections.

Referring to FIGS. 16-18, these figures illustrate characteristic pressure loss curves for the sections of a distributor having the alternative form illustrated in FIG. 2A, and correspond to FIGS. 10-12 for the distributor of FIG. 2. Thus, the curve in FIG. 16 illustrates pressure in the distribution channel 32' and the ordinates above the curve to the horizontal base line indicated, represent pressure loss through each cross distribution channel at given lateral distances from the center line of the distributor. FIG. 17 illustrates pressure loss in the pressure control section 36' by the upper curve, and in the time lag control section 40' by the lower curve (under the cross hatched area). The objective is to provide a pressure loss characteristic through the pressure control section 36' as shown in FIG. 17, such as to substantially fully compensate for the non-linear variations in pressure loss through the distribution section 32' (FIG. 15). Thus, in keeping with the invention the sum of the ordinates of the two pressure loss curves approximate a constant value throughout the entire extent of the die orifices as illustrated in FIG. 18, the variations from that constant value being less than with the distributor of FIG. 2. Referring to FIG. 18, the variable pressure loss in the distribution section 32' ideally is fully compensated by the pressure loss in the pressure loss control section 36', it being assumed that pressure loss variation in the large passage time lag control section 40' is relatively insignificant and may be ignored.

The curves of FIGS. 19-21 represent residence time characteristics for the sections of the distributor of FIG. 2A. The time lag control section curve of FIG. 20 is non-linear representing that the time lag in that section ideally entirely compensates for variations in residence time in the distribution section 32' of the distributor as illustrated in FIG. 19 allowing for the small and gradual variation in time lag in the pressure control section of the distributor as illustrated by the cross hatched section at the lower part of FIG. 20. Thus, in keeping with the invention, the total residence time curve, which is the sum of the ordinates of the curves of FIGS. 19 and 20, and which is illustrated in FIG. 21, ideally is a constant straight line curve substantially throughout the entire width of the die except for the regions closely adjacent the extreme ends of the die. Again, the sheet produced by the die may be trimmed at its edges to eliminate that section of the exudate at the extreme edges.

The preferred practical approach for laying out a distributor constructed according to this invention, entails beginning with a base line representing the exit from the distributor and sequentially laying out the required axial lengths of the control section pasages and then the distribution channels as determined by prior mathematical or empirical analysis. This will result in the case of a distributor of the form illustrated in FIG. 2A, in the channels of the distribution section having curved boundaries. The exact curvature of these channels of the distribution section 32' are thus determined by the lengths in the direction of axial flow of the passages of the pressure loss and time lag control sections 36' and 40'. In cross section, the distribution channels of both distributors illustrated herein taper in both width and depth, while the pressure control and time lag control section passage are of substantially constant depth while tapering in width, to produce the pressure loss and time lag characteristics shown in FIGS. 10-21.

While in the forms of the invention discussed thus far, it has been applied to a sheet or flat film extrusion die, it is recognized that the invention may be applied to tubular polymer extrusion dies by, in effect, wrapping two laterally extending halves of the dies with distributors of the configuration shown in FIGS. 2 or 2A such that they are in tubular form meeting directly opposite the inlet from the extruder and provide a tubular or circular orifice means.

Turning now to FIGS. 4-9, there is illustrated apparatus for forming a primary gas stream containing discontinuous polymeric microfibers by a known melt blowing technique, such as the one described in an article entitled "Superfine Thermoplastic Fibers", appearing in *Industrial and Engineering Chemistry*, Vol. 48, No. 8, pp. 1342-1346, which describes work done at the Naval Research Laboratories in Washington, D.C. Also, see Naval Research Laboratory Report 111437, dated Apr. 15, 1954 and U.S. Pat. No. 3,676,242, issued July 11, 1972 to Prentice. Basically, the method of formation involves extruding a molten polymeric material through a row of apertures 111 serving as orifice defining means for a die 110, so that the exudate appears as fine polymer streams, and attenuating the streams by converging flows of high velocity, heated gas (usually air) supplied from nozzles 112 and 113 to break the polymer streams into discontinuous microfibers of small diameter. In general, the resulting microfibers have an average fiber diameter of up to only about 10 microns with very few, if any, of the microfibers exceeding 10 microns in diameter. Usually, the average diameter of the microfibers is within the range of about 2-6 microns, typically averaging about 5 microns. While the microfibers are predominantly discontinuous, they generally have a length exceeding that normally associated with staple fibers.

There are a number of different polymers that can be used to form the melt blown microfibers, so that materials can be fashioned with different physical properties by the appropriate selection of polymers or combinations thereof. Among the many useful thermoplastic polymers, polyolefins such as polypropylene and polyethylene, polyamides, polyesters such as polyethylene teraphthalate, and thermoplastic elastomers such as polyurethanes are anticipated to find the most widespread use in the preparation of the materials described herein.

In order to supply hot air to the nozzles 112 and 113, a pair of manifold tubes 114 and 115 are mounted on a pair of blocks 116 and 117 on opposite sides of the die 110. These manifold tubes receive pressurized hot air from a suitable source (not shown) and feed the hot air into a pair of elongated slots 118 and 119 formed by the respective blocks 116 and 117 and communicating with the nozzles 112 and 113. As shown most clearly in FIG. 6, the nozzles 112 and 113 are oriented to direct the hot air jets inwardly toward the die head 111' so that the high velocity jets converge on the polymer streams issuing from the die head to attenuate those streams and form a stream of discontinuous microfibers. To permit adjustment of the nozzle width for controlling the rate at which pressurized hot air is discharged therefrom, the outboard sides of the nozzles 112 and 113 are formed by series of segments 120 and 121, alternate ones of which are carried on the ends of two rows of threaded adjusting screws 122 and 123. Thus, by turning the screws 122 and 123, the throats of the nozzles 112 and 113 may be opened or restricted to control the flow rates of the air jets passing therethrough. And since each of the adjustable segments is adjustable independently of all other segments, the flow rates may be varied along the length of each nozzle by opening or restricting certain portions of the nozzle more than other portions. Those segments 120 and 121 which are not carried by the adjusting screws 122 and 123 are fixed.

Pressurized molten polymer enters the illustrative melt blowing apparatus through a centrally located inlet port 130 and flows on through a passageway 131 formed by an inlet fitting 132 into the distribution cavity 134 formed between mating halves 136, 138 of the die body. To control the temperature of the polymer within the distributor, it may be desired to provide supplemental heating means herein shown as two banks of electrical heating units 144 and 145 mounted on opposite sides of the die body. In the illustrative arrangement, each bank of the electrical heating units 144 and 145 comprises five separate heating units, each of which is separately controlled independently of all the other heating units in that bank so that a predetermined temperature profile may be produced along the length of the distributor by means such as separate thermocouples 146 for independently sensing the temperature in each of five regions so that the corresponding heating elements can be controlled to produce the desired temperature profile.

The distributor cavity, in accordance with the present invention, is constructed with separate distribution, pressure drop and time lag control sections for controlling the flow of polymer to the die apertures 111, as exemplified by the configurations shown in FIGS. 2 and 2A. An apertured plate 150 extending along the entire length of the die supports a stack of screens 154. Since the extrusion apertures are small, in the absence of such filtering screens plugging may be a problem. Although screens of this type are normally not sufficiently rigid to be self-supporting, the apertured plate 150 provides an adequate solid area on the downstream side of the screens 154 to hold them in place even when subjected to the pressure of the molten polymer.

As can be seen from the foregoing detailed description, the invention provides an improved extrusion die that can be made in any desired width without significantly changing the height of the die, because the die height is substantially independent of the die width. Furthermore, by using the preferred cavity configuration for the die distributor with linear boundaries between sections, the cavity may be made by machining the channels and passages in one of a pair of mating elements by conventional machine tools, thus minimizing the practical problems in fabricating the die assembly regardless of its size.

The actual dimensions of the channels and passages forming the three sections of the die cavity may be based on an analysis of non-Newtonian, laminar, isothermal flow of sufficiently high apparent viscosity so that inertial forces are negligible, or the channels and passages of the sections may be empirically developed and machined, and curves produced representing pressure loss and time lag similar to those illustrated herein. The basic mathematical approach to such analysis or empirical technique to develop the shape of the passages are well understood by those skilled in the art.

Equations are provided above for determining the relative dimensions of the preferred form of trapezoidal channel for the distribution section, together with the preferred range of the constant C used in those equations. Following is a table of characteristics for the distributor for a 60 inch wide melt blowing die as shown in FIG. 6 as a further exemplification of the invention:

| CHARACTERISTICS OF POLYMER DISTRIBUTOR | 60" Die |
| --- | --- |
| Residence Time, sec. | 30 |
| Distributor Entrance Area, sq. in. | 0.6 |
| Distributor Velocity, fpm | 5.44 |
| Distributor Time Lag, sec. | 27.6 |
| Distributor Pressure Drop, psi | 3.9 |
| Difference between Maximum and Minimum Length of Pressure Control Section, inch | 1.5 |
| Depth of Pressure Control Passage, inch | .044 |
| Depth of Lag Control Passage, inch | 0.375 |
| Difference between Maximum and Minimum Length of Lag Control Passage, inch | 1.5 |
| Total Distributor Pressure Drop, psi | 9.0 |
| Die Pressure Drop, psi | 40–50 |
| Extrusion Rate | 150 lbs./hr. |

The overall height of a 60 inch die which has been constructed with a distributor providing the characteristics set forth above is about 8 inches. A 30 inch die with a distributor constructed according to this invention has also been made and its overall height is 8 inches, the same, it will be noted, as the 60 inch die, while a 90 inch die for the same polymer will have a height not significantly greater than the 60 inch die. In short, the overall die height is substantially the same for narrow as for wide line dies. For comparison, coat hanger dies of conventional construction may have a height of about 20 inches for a 30 inch die, while a 60 inch die will typically have a height of about 32 inches and a 90 inch die would have a height of about 4 feet — if it were practical to make one. Such massive dies for wide lines are difficult to fabricate and are very costly.

Using the teachings of this invention, the height of the pressure control section can be selected (e.g., 1 to 2 inches) to make the axial length at the center of the die convenient for construction. Similarly, the depth of the time lag section can be selected to make the required axial length at the center of the die convenient (also 1 to 2 inches). This choice is essentially independent of the end to end dimension of the die. The greater the end to end dimension of the die, the greater the pressure drop in the distributor and the greater the time lag, so the less the height of the pressure control section and the larger the depth of the time lag sections. The principal limitation in reducing the height of the pressure control section concerns the precision required in machining to maintain uniformity. Generally heights greater than 0.040 inch are preferred so that a tolerance of 0.001 inch in machining represents 2½ percent of the opening.

With distributors according to the present invention, it becomes feasible to fabricate at relatively low cost wide line dies which provide substantially constant pressure drop and residence time and thus are usable for extruding degradable polymers and obtaining more uniform and higher quality polymer sheets and fibrous webs.

I claim as my invention:

1. In an extrusion die for thermoplastic polymer,
an elongated orifice defining means,
an inlet for receiving molten polymer from an extruder, the axis of said inlet being normal to and intermediate the ends of said orifice defining means, and distributor means defining a distributor cavity connected to and symmetrical laterally of the axis of the inlet and through which molten polymer flows axially from said inlet toward said orifice defining means, said distributor cavity having axially connected sections including: (1) a distribution section having means defining channels for conveying polymer from the inlet laterally and in which the pressure loss and residence time of polymer flow varies across the full extent of said orifice defining means; (2) a pressure loss control section having, downstream of said distribution section, means defining passages of restricted substantially constant depth and of varying axial length in which the residence time is short and substantially constant, and; (3) a time lag control section having, downstream of said pressure loss control section, means defining passages of enlarged substantially constant depth compared with said pressure control section and of varying axial length in which the pressure loss is small and substantially constant, each of said sections having a pressure loss characteristic curve and a residence time characteristic curve the ordinates of which represent pressure loss and residence time of molten polymer flowing axially through each section at various lateral distances from the inlet axis, and wherein at any given lateral distance (1) the sum of the ordinates of the pressure loss characteristic curves of the distribution section and pressure loss control section is substantially a constant value, and (2) the sum of the ordinates of the residence time characteristic curves of the distribution section and time lag control section is substantially a constant value, such that the pressure loss control section compensates for the varying pressure loss in the distribution section and the time lag control section compensates for the varying residence time in the distribution section, and the pressure loss and residence time of molten polymer flowing from said inlet to all points along said orifice defining means is substantially constant.

2. A distributor means in an extrusion die according to claim 1, wherein said distribution section channels decrease in both width and depth in each lateral direction away from said inlet such that axial cross sections of said channels are geometrically similar throughout, and wherein said pressure control and time lag control section passages are substantially constant depth and taper in width in each lateral direction away from the inlet except where said passages gradually merge.

3. A distributor means in an extrusion die according to claim 2 wherein the boundaries between said sections are curved.

4. A distributor means in an extrusion die according to preceding claim 2 wherein the boundaries between said sections are straight.

5. A distributor means in an extrusion die according to claim 2, wherein said distribution section channels are trapezoidal in axial cross section.

6. A distributor means in an extrusion die according to claim 2, wherein said pressure control section passages are intermediate said distribution section channels and said lag control section passages and have curved boundaries where they merge.

7. In an extrusion die for thermoplastic polymer,
an elongated orifice defining means,
an inlet for receiving molten polymer from an extruder, the axis of said inlet being normal to and intermediate the ends of said orifice defining means, and
distributor means defining a distributor cavity connected to and symmetrical laterally of the axis of the inlet and through which molten polymer flows axially from said inlet toward said orifice defining means,
said distributor cavity having axially connected sections including: (1) a distributor section having means defining a channel for conveying polymer from the inlet laterally and in which the pressure loss and residence time of polymer flow varies across the full extent of said orifice defining means; (2) a pressure loss control section having, downstream of said distribution section, means defining a passage of substantially constant restricted depth and of varying axial length in which the residence time is short and substantially constant, and; (3) a time lag control section having, downstream of said pressure loss control section, means defining a passage of substantially constant depth larger than said pressure control section passage and of varying axial length in which the pressure loss is small and substantially constant; the varying axial length of said pressure loss control section passage providing a pressure loss characteristic which compensates for the varying pressure loss in the distribution section and the varying axial length of said time lag control section passage providing a residence time characteristic which compensates for the varying residence time in the distribution section, such that the pressure loss and residence time of molten polymer flowing from said inlet to all points along said orifice defining means is substantially constant.

8. In an extrusion die according to claim 7, said orifice defining means including spaced orifices downstream of said distributor means for extruding separate streams of polymer, and said extrusion die having as supply means carried adjacent said orifice defining means and nozzles for directing flows of gas from said supply downstream of said spaced orifices to break said stream of polymer into discontinuous microfibers.

9. In an extrusion die according to claim 7, said orifice defining means including a continuous orifice downstream of said distributor means for extruding a continuous sheet of polymer.

10. In an extrusion die for thermoplastic polymer, having an axis,
an elongated orifice defining means,
an inlet for receiving molten polymer from an extruder, said inlet being on said axis and said orifice defining means extending substantially normal to said axis, and
a pair of distributor elements one having a recessed surface and the other a smooth surface held in abutting relation and together defining a distributor cavity connected to said inlet and extending laterally of said axis and through which molten polymer flows laterally and axially from said inlet toward said orifice defining means,
said recessed surface of said one distributor element having formed therein: (1) a distribution section having means defining a channel for conveying polymer from the inlet laterally which tapers in both width and depth in each lateral direction away from said inlet; (2) a pressure loss control section having means defining a passage of substantially constant restricted depth and of varying axial length, connected to and downstream of said channel, and; (3) a time lag control section having means defining a passage of substantially constant depth larger than, connected to and downstream of said pressure control section passage and of varying axial length; the varying axial length of said pressure loss control section passage providing a pressure loss characteristic which compensates for the varying pressure loss in the distribution section and the varying axial length of said time lag control section passage providing a residence time characteristic which compensates for the varying residence time in the distribution section, such that the pressure loss and residence time of molten polymer flowing from said inlet through said distributor cavity to all points along said orifice defining means is substantially constant.

11. An extrusion die for thermoplastic polymer having a die body, orifice defining means extending the full width of the die body, an inlet intermediate the ends of the die body for receiving molten polymer from an extruder and distributor means including a pair of distributor elements one having a recessed surface and the other a flat surface held in abutting relation and together defining a distributor cavity symmetrical laterally of the axis of the inlet and connecting said inlet with said orifice defining means, said distributor cavity having axially connected sections including
a distribution section having means forming channels in said one distributor element for conveying molten polymer from said inlet laterally toward both ones of said cavity which channels taper in width and depth from the inlet to the end of the cavity,
a first control section downstream of said distribution section having means forming an axial pressure loss control passage in said one distributor element of restricted depth and tapering in width from the inlet to the end of the cavity, and
a second independent control section downstream of said first control section having means forming an axial time lag control passage in said one distributor element of depth larger than said pressure loss control passage and tapering in width from the inlet to the end of the cavity.

12. An extrusion die according to claim 11 wherein said distribution channels are trapezoidal in axial section and linearly taper in both width and depth.

13. An extrusion die according to claim 11 wherein said distribution channels are trapezoidal in axial section and non-linearly taper in width.

14. An extrusion die according to claim 11 wherein said distribution channels have a trapezoidal axial section and linearly taper in both width and depth, said pressure loss control passage has a constant depth, and said time lag control passage has a beveled entrance and a constant depth downstream of said entrance larger than said pressure loss control passage.

15. In an extrusion die for thermoplastic polymer, having an axis,
an elongated orifice defining means extending substantially normal to said axis,
an inlet for receiving molten polymer from an extruder, said inlet being upstream of said orifice defining means, and distributor means defining a distributor cavity connected to and extending laterally of said inlet and through which cavity molten polymer flows laterally and axially from said inlet toward said orifice defining means, said distributor cavity having axially connected sections, all said sections extending laterally from said axis substantially the full extent of said orifice defining means and including a distribution section having means defining a channel downstream of said inlet for conveying polymer from said inlet laterally and in which the pressure loss and residence time of polymer flow varies across the full extend of said orifice defining means, a pressure loss control section having means defining a passage downstream of said distribution section for conveying polymer axially and for controlling polymer flow so that the pressure loss varies and the residence time is short and relatively constant, and a time lage control section having means defining a passage downstream of said pressure loss control section for conveying polymer axially and for controlling polymer flow so that the residence time varies and the pressure loss is small and relatively constant, the varying pressure loss in said pressure loss control section means compensating across the full extent of said orifice defining means for the pressure loss in said distribution section means and the varying residence time in said time lag control section means compensating across the full extent of said orifice defining means for the varying residence time in said distribution section means, such that the pressure loss and residence time of molten polymer flowing from said inlet to all points along said orifice defining means is substantially constant.

16. In an extrusion die for thermoplastic polymer, having an axis, an elongated orifice defining means extending substantially normal to said axis, an inlet for receiving molten polymer from an extruder, said inlet being on said axis upstream of said orifice defining means, and distributor means defining a distributor cavity connected to and receiving molten polymer from said inlet and extending laterally of said axis, through which cavity molten polymer flows laterally and axially from said inlet toward said orifice defining means, said distributor cavity having axially connected sections, all extending laterally of said axis substantially the full extent of said orifice defining means, including a distribution section having channel means downstream of said inlet for conveying polymer from the inlet laterally and in which the pressure loss and residence time of polymer flow varies across the full extent of said orifice defining means, a pressure loss control section having passage means downstrem of said distribution section for conveying polymer from said distribution section axially and in which the pressure loss of polymer varies and the residence time of polymer is short and substantially constant, and a time lag control section having passage means downstream of said pressure loss control section for conveying polymer axially from said pressure loss control section and in which the residence time of polymer varies and the pressure loss of polymer is small and substantially constant, the varying pressure loss in said pressure loss control section passage means compensating for the varying pressure loss in said distribution section and the varying residence time in said time lag control section passage means compensating for the varying residence time in said distribution section, such that the pressure loss and residence time of molten polymer flowing from said inlet to all points along said orifice defining means is substantially constant.

* * * * *

UNITED STATES PATENT OFFICE
CERTIFICATE OF CORRECTION

Patent No. 4,043,739          Dated August 23, 1977

Inventor(s) David W. Appel

It is certified that error appears in the above-identified patent and that said Letters Patent are hereby corrected as shown below:

Column 1, line 12, after "aperture" delete "service" and insert -- serving --.

Column 1, line 36, after "a" change "coat hanger" to -- "coat hanger" --.

Column 2, line 43, after "heretofore" change "coat hanger" to -- "coat hanger" --.

Column 4, line 26, after "the" change "axial length" to -- "axial length" --.

Column 4, line 26, after "or" change "width" to -- "width" --.

Column 4, line 41, after "example" change "coat hanger" to -- "coat hanger" --.

Column 4, line 42, after "employed a" delete "distributor" and insert -- distribution --.

Column 5, line 6, after "practical" delete "applications" and insert -- application --.

Column 5, line 34, after "FIG." delete "1" and insert -- 2 --.

Column 5, line 41, delete "49" and insert -- 40 --.

Column 5, line 48, before "or breadth w" insert -- width --.

UNITED STATES PATENT OFFICE
CERTIFICATE OF CORRECTION

Patent No. 4,043,739     Dated   August 23, 1977

Inventor(s) David W. Appel

It is certified that error appears in the above-identified patent and that said Letters Patent are hereby corrected as shown below:

Column 6, line 39, after "characteristic" delete "is" and insert -- in --.

Column 7, line 6, after "passage" delete "and".

Column 7, line 41, after "substantially" insert -- constant --.

Column 7, line 44, after "depth" and before "d" insert -- meaning a fixed depth --.

Column 7, line 45, delete "meaning a fixed depth".

Column 7, line 47, after "could" delete "connect" and insert -- collect --.

UNITED STATES PATENT OFFICE
CERTIFICATE OF CORRECTION

Patent No. 4,043,739            Dated August 23, 1977

Inventor(s) David W. Appel

It is certified that error appears in the above-identified patent and that said Letters Patent are hereby corrected as shown below:

Column 13, line 13, after "a" delete "distributor" and insert -- distribution --.

Column 13, line 24, after "a" delete "pass-" and insert -- pas- --.

Column 13, line 42, after "having" delete "as" and insert -- gas --.

Column 15, line 13, after "full" delete "extend" and insert -- extent --.

Column 15, line 19, after "time" delete "lage" and insert -- lag --.

Signed and Sealed this

Eighteenth Day of April 1978

[SEAL]

Attest:

RUTH C. MASON
Attesting Officer

LUTRELLE F. PARKER
Acting Commissioner of Patents and Trademarks